(12) United States Patent
Chen

(10) Patent No.: US 8,664,543 B2
(45) Date of Patent: Mar. 4, 2014

(54) INSULATIVE WIRE-CLIPPING BUSHING

(75) Inventor: Bi-Ju Chen, Taipei (TW)

(73) Assignee: Best Exclusive Holdings Limited, Taipei (TW)

( * ) Notice: Subject to any disclaimer, the term of this patent is extended or adjusted under 35 U.S.C. 154(b) by 131 days.

(21) Appl. No.: 13/331,186

(22) Filed: Dec. 20, 2011

(65) Prior Publication Data
US 2013/0153265 A1    Jun. 20, 2013

(51) Int. Cl.
*H02G 3/18* (2006.01)

(52) U.S. Cl.
USPC .............. 174/659; 174/650; 174/660; 248/56

(58) Field of Classification Search
USPC ................. 174/650, 659, 660; 248/56; 16/2.2
See application file for complete search history.

(56) References Cited

U.S. PATENT DOCUMENTS 4,299,363 A * 11/1981 Datschefski .................... 248/56
5,442,141 A    8/1995 Gretz

* cited by examiner

*Primary Examiner* — Dhirubhai R Patel
(74) *Attorney, Agent, or Firm* — Leong C. Lei

(57) ABSTRACT

An insulative wire-clipping bushing includes a main body, support frames and a pair of clip bodies. The main body has a first surface and a second surface, and the support frames are installed and extended from symmetric edges of the first surface, and ends of the support frames are bent inwardly to form a half-hood structure, and the pair of clip bodies are installed and extended from the first surface and disposed between the support frames, and the pair of clip bodies are installed symmetrically, and ends of the pair of clip bodies are bent inwardly to form a tapered hook structure, and a wiring space is formed between the ends of the clip bodies, so that the bushing can be passed into a through hole of an electricity distribution box to pass and install at least one wire and provide a clipping force required for clamping the wire.

7 Claims, 3 Drawing Sheets

INSULATIVE WIRE-CLIPPING BUSHING

BACKGROUND OF THE INVENTION

1. Field of the Invention

The present invention relates to the field of a protective structure of electric cables or wires installed in a construction building, in particular to an insulative wire-clipping bushing installed onto an electricity distribution box and provided for clipping and fixing a wire such as an electric cable or an electric wire.

2. Description of the Related Art

In general, an electricity distribution box structure used for the electricity distribution of a building is a rectangular or polygonal hollow box structure to facilitate construction workers to do the work of wiring at least one electric wire. During the construction, other electric wires adjacent to the working one are usually pulled to cause an insufficient length or a scratch formed on a surface of a rubber layer of the electric wire, and thus jeopardizing our safety. Therefore, the electricity distribution box usually includes an insulative wire-clipping bushing installed into each through hole of the electricity distribution box to facilitate passing the electric wire and protecting and preventing the rubber layer from being scratched, and provide an appropriate clipping force to prevent pulling back the electric wires or having an insufficient length.

With reference to FIG. 1 for a schematic view of a structure of an insulating wire clipping cover as disclosed in U.S. Pat. No. 5,442,141, the insulative wire-clipping bushing 1 is substantially an integrally formed C-shaped bushing structure made of an elastic material, and having an outer distal portion 11 and an inner distal portion 12 formed on an external side of the insulative wire-clipping bushing 1, and the insulative wire-clipping bushing 1 is extended from a distal wall to a central position at a rear end for passing a wire 2. In addition, the insulative wire-clipping bushing 1 has a notch 13 to facilitate the installation or removal of the insulative wire-clipping bushing 1 in a through hole of the electricity distribution box, and the notch 13 can reduce the total volume and be used for passing the insulative wire-clipping bushing 1 into the through hole. After the insulative wire-clipping bushing 1 is passed into the through hole, the original form is restored quickly and the insulative-wire clipping bushing 1 is fixed to the electricity distribution box. In addition, the insulative wire-clipping bushing includes a pair of claw members 14 extended in a direction from an end to the rear end, and the pair of claw members 14 are installed opposite to each other.

When use, the diameter of the clipping wire 2 is greater than the width of the notch 13, the pair of claw members 14 are stretched outwardly to have a larger volume and limited by the through hole to produce a sufficient clipping force. If the diameter of the wire 2 is equal to or smaller than the width of the notch 13, then the notch 13 will not be able to provide a sufficient clipping force due to a buffer space so formed, and thus the original function cannot be achieved.

SUMMARY OF THE INVENTION

Therefore, it is a primary objective of the present invention to provide an insulative wire-clipping bushing having a circular main body integrally formed and made of an elastic material, and the main body has a pair of support frames and a pair of clip bodies alternately installed with one another, and the support frame and the pair of clip bodies can provide a sufficient clipping force to clamp a wire.

The secondary objective of the present invention is to provide an insulative wire-clipping bushing that uses the pair of clip bodies having oblique portions disposed on the clip bodies respectively and opposite to one another, and achieves the effect of protecting the rubber layer of the wire from being damaged.

To achieve the aforementioned objective, the present invention provides an insulative wire-clipping bushing, installed in a through hole of an electricity distribution box, and provided for passing and clipping at least one wire, and the insulative wire-clipping bushing comprising: a main body, being a circular structure, and having a first surface and a second surface; a pair of support frames, separately installed and extended from symmetric edges of the first surface, and an end of the support frames being bent inwardly to form a tapered half-hood structure, and the support frame having a first thickness T, and the support frame being passed into the through hole, and abutted against the through hole by the first surface; and a pair of clip bodies, extended and installed on the first surface and disposed between the support frames, and the pair of clip bodies being installed symmetrically, and ends of the pair of clip bodies being bent inwardly to form a hook structure, and a wiring space being formed between the ends of the pair of clip bodies for passing and clamping the wire, and the ends of the pair of clip bodies having a second thickness that is two to three times larger than the first thickness, and a predetermined distance D being reserved between the pair of clip bodies and the support frames.

Wherein, each of the pair of the clip bodies has an oblique portion disposed at an end of the clip body, and the oblique portions are arranged towards the center of the main body to facilitate passing and installing the wire and prevent the surface of the wire from being damaged by the friction produced during the installation process.

Wherein, each of the pair of the clip bodies has an enhanced rib disposed on an inner wall surface of the clip body and installed along an extending direction of the clip body to improve the strength of the pair of clip bodies and provide an effective clipping force.

Wherein, each of the pair of clip bodies has a latch portion disposed on outer wall surface of each clip body, and the distance between the latch portions and the first surface is set according to the thickness of the electricity distribution box, and the latch portion is a triangular block structure having an abutting surface formed thereon and aligned opposite to the first surface and an oblique surface disposed adjacent to the abutting surface and provided for passing and latching into the through hole, such that the installation is convenient and secured.

Wherein, the predetermined distance D is limited to 0.8 to 2.5 times of the first thickness so as to enhance the overall strength of the insulative wire-clipping bushing and the clipping force of the pair of clip bodies.

DETAILED DESCRIPTION OF THE PREFERRED EMBODIMENTS

The technical contents of the present invention will become apparent with detailed description of a preferred embodiment and the illustration of related drawings as follows.

Figure 1:
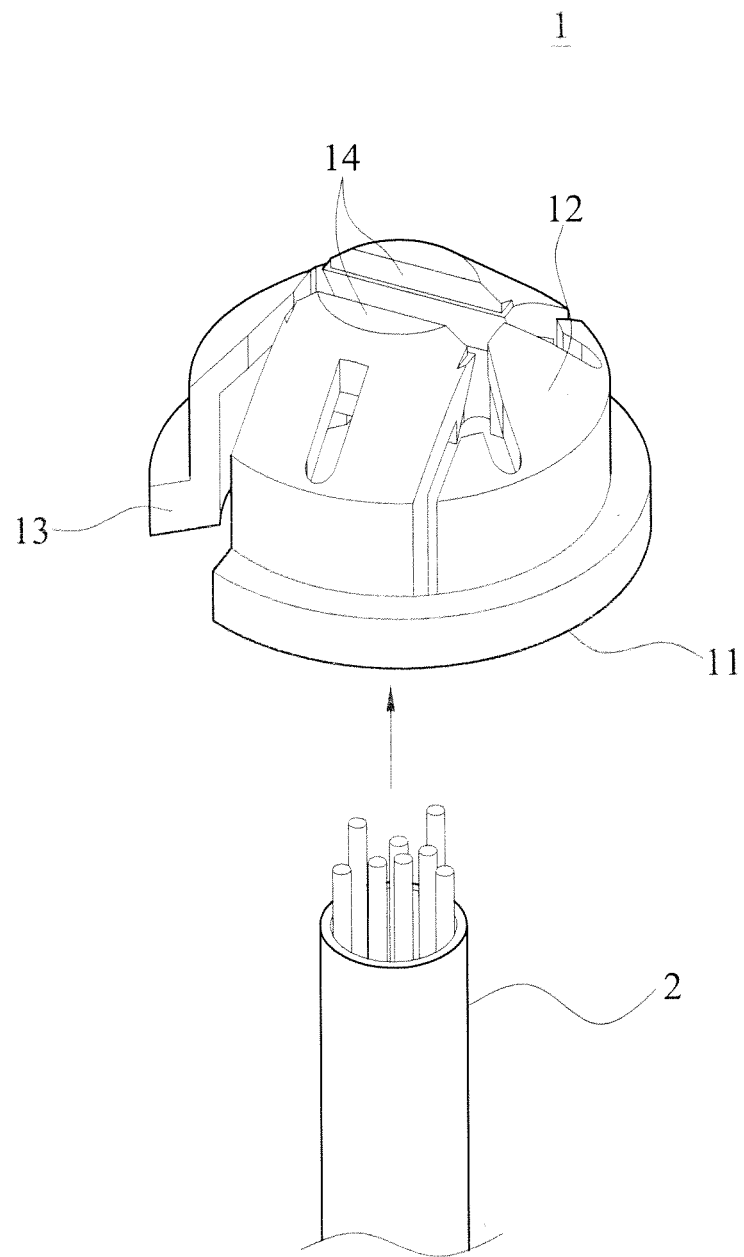
FIG. 1 is a schematic view of a structure of an insulating wire clipping cover as disclosed in U.S. Pat. No. 5,442,141.
Figure 2:
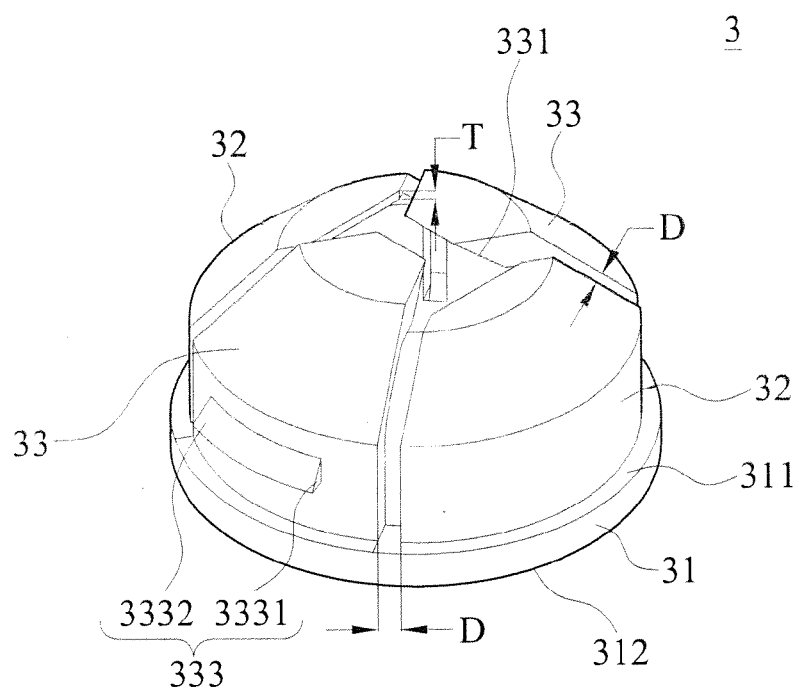
FIG. 2 is a schematic view of a structure in accordance with a preferred embodiment of the present invention viewed from a first viewing angle.
Figure 3:
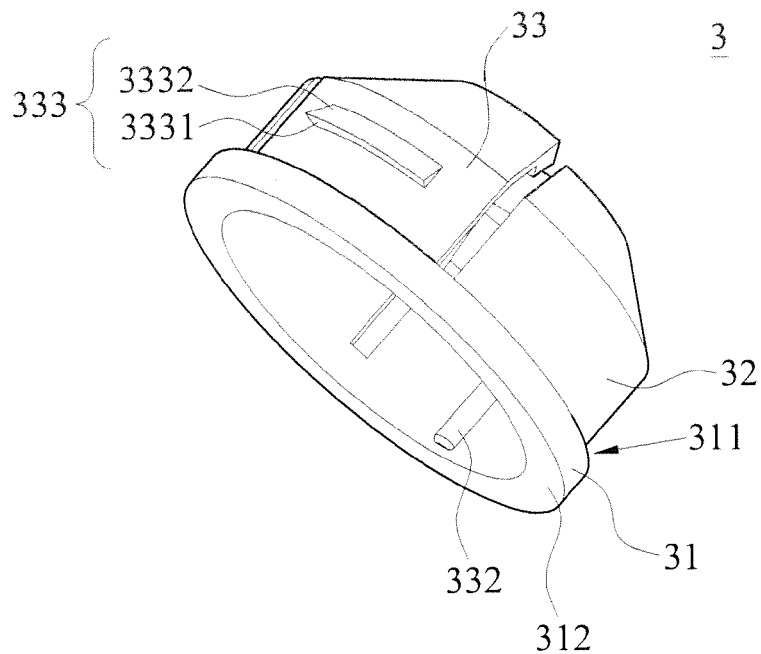
FIG. 3 is a schematic view of a structure in accordance with a preferred embodiment of the present invention viewed from a second viewing angle.
Figure 4:
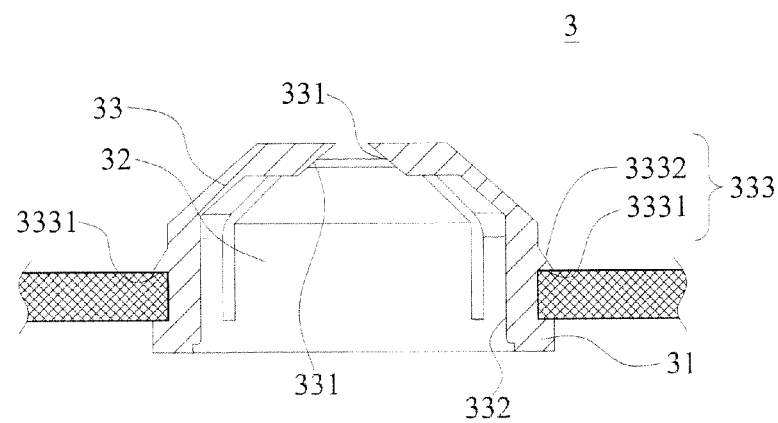
FIG. 4 is a cross-sectional view of a preferred embodiment of the present invention.

With reference to FIGS. 2 to 4 for schematic views and across-sectional view of a preferred embodiment of the present invention respectively, the insulative wire-clipping bushing 3 is made of an elastic material and integrally formed into a substantially a cap-shaped structure, and the insulative wire-clipping bushing 3 comprises a main body 31, a pair of support frames 32 and a pair of clip bodies 33.

The pair of main bodies 31 are substantially a circular structure, and the main body 31 has a first surface 311 and a second surface 312 to form a cap rim of the insulative wire-clipping bushing 3.

The support frames 32 are disposed and extended from symmetrical distal edges of the first surface 311 respectively, and an end of the support frames 32 is a half-hood structure bent inwardly and tapered progressively, wherein the support frames 32 has a first thickness T.

The pair of clip bodies 33 are extended from the first surface 311 and disposed between the support frames 32, and the support frames 32 and the pair of clip bodies 33 are passed and inserted alternately with one another. In other words, the support frames 32 and the clip bodies 33 are arranged into a support frame 32-a clip body 33-a support frame 32-a clip body 33 structure, and the pair of clip bodies 33 are also installed symmetrically, and ends of the pair of clip bodies 33 are bent inwardly to form a hook shaped cross-sectional shape (as shown in FIG. 4), and a wiring space (not labeled in the figure) is formed between the two ends of the pair of clip bodies 33, and the thickness of the end of the pair of clip bodies 33 is two to three times larger than the first thickness, and a predetermined distance D is reserved between the pair of clip bodies 33 and the support frames 32. It is noteworthy to point out that the predetermined distance D is 0.8 to 2.5 times of the first thickness; the smaller the predetermined distance D, the larger is the overall strength of the insulative wire-clipping bushing 3; and the larger the predetermined distance D, the smaller is the overall strength of the insulative wire-clipping bushing 3. In addition, each of the pair of clip bodies 33 has an oblique portion 331 disposed thereon, and the pair of oblique portions 331 are arranged towards the center of the main body 31. In addition, each of the pair of clip bodies 33 has an enhanced rib 332 installed on an inner wall surface of each clip body 33, and the enhanced ribs 332 are installed along the extending direction of the clip body 33 to improve the overall strength of the clip bodies 33 significantly. Each of the pair of clip bodies 33 has a latch portion 333 disposed on an outer wall surface of the clip body 33, and the pair of the latch portions 333 are triangular block structure having an abutting surface 3331 formed and aligned opposite to the first surface 311, and an oblique surface 3332 disposed adjacent to the abutting surface 3331.

Figure 5:
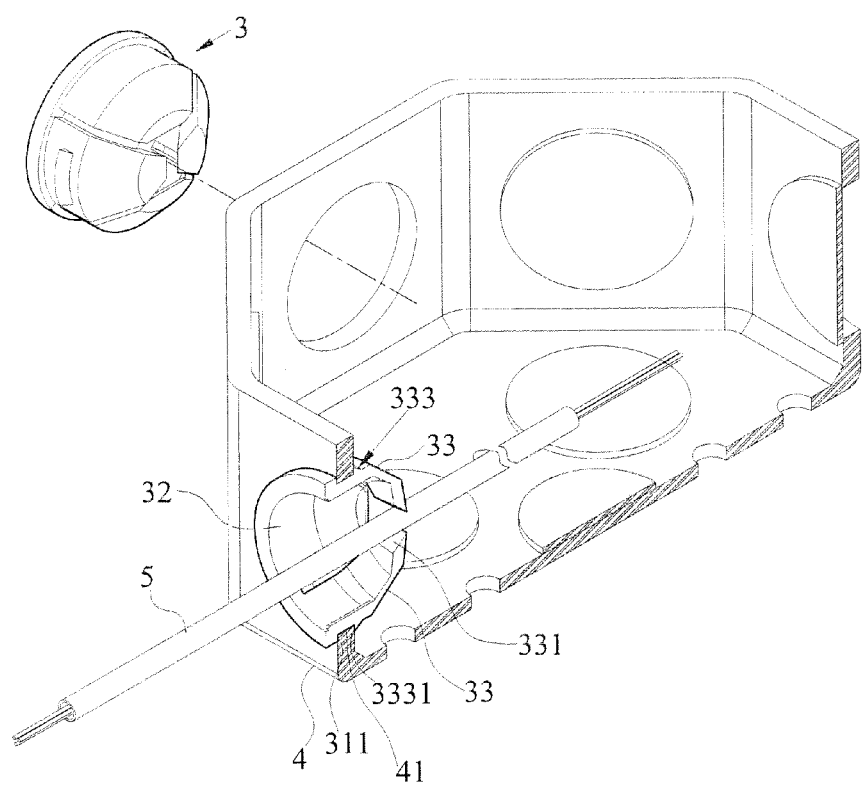
FIG. 5 is a schematic view of installing and using a preferred embodiment of the present invention.

With reference to FIG. 5 for installing and using a preferred embodiment of the present invention, when the insulative wire-clipping bushing 3 is installed into a through hole 41 of an electricity distribution box 4, the distance between the latch portions 333 and the first surface 311 corresponds to the thickness of the electricity distribution box 4, so that when the insulative wire-clipping bushing 3 is installed, the oblique surfaces 3332 of the latch portions 333 are inserted into the through hole 41 in a corresponding direction, and the support frames 32, the first surface 311 and the abutting surfaces 3331 are clipped and fixed to the electricity distribution box 4. When a wire 5 is passed into the insulative wire-clipping bushing 3 for use, the wire 5 is passed into a wiring space formed between the pair of clip bodies 33, and the wire 5 is used to push and squeeze the pair of oblique portions 331 to prop outwardly, and the wire 5 is passed into the sheath.

In summation, the insulative wire-clipping bushing 3 of the present invention is made of an elastic material and integrally formed into the circular main body 31, and the support frames 32 and the clip bodies 33 are arranged alternately to one another to provide a sufficient clipping force to clip the inserted wire 5. In addition, the pair of clip bodies 33 includes the pair of opposite oblique portions 331 respectively for facilitating passing the wire 5 and protecting a rubber layer of the wire 5 from being damaged.

What is claimed is:

1. An insulative wire-clipping bushing, installed in a through hole of an electricity distribution box, and provided for passing and clipping at least one wire, and the insulative wire-clipping bushing comprising:
a main body, being a circular structure, and having a first surface and a second surface;
a pair of support frames, separately installed and extended from symmetric edges of the first surface, and an end of the support frames being bent inwardly and having a tapered half-hood shape, and the support frame having a first thickness, and the support frames being passed into the through hole, and abutted against the through hole by the first surface; and a pair of clip bodies, extended and installed on the first surface and disposed between the support frames, and the pair of clip bodies being installed symmetrically, and ends of the pair of clip bodies being bent inwardly and having a hook shaped cross-sectional shape, and a wiring space being formed between the ends of the pair of clip bodies for passing and clamping the wire, and the ends of the pair of clip bodies having a second thickness that is two to three times larger than the first thickness, and a predetermined distance being reserved between the pair of clip bodies and the support frames, wherein the wire is clamped only by a portion of each of the pair of clip bodies.

2. The insulative wire-clipping bushing of claim 1, wherein the portion of each of the pair of the clip bodies is an oblique portion disposed at an end of the clip body, and the oblique portions are arranged towards the center of the main body.

3. The insulative wire-clipping bushing of claim 1, wherein each of the pair of the clip bodies has an enhanced rib disposed on an inner wall surface of the clip body.

4. The insulative wire-clipping bushing of claim 3, wherein the enhanced rib is installed along an extending direction of the clip body.

5. The insulative wire-clipping bushing of claim 1, wherein each of the pair of clip bodies has a latch portion disposed on outer wall surface of each clip body, and the distance between the latch portions and the first surface is set according to the thickness of the electricity distribution box.

6. The insulative wire-clipping bushing of claim 5, wherein the latch portion is a triangular block structure having an abutting surface formed thereon and aligned opposite to the first surface and an oblique surface disposed adjacent to the abutting surface and provided for passing and latching into the through hole.

7. The insulative wire-clipping bushing of claim 1, wherein the predetermined distance is 0.8 to 2.5 times the first thickness.

\* \* \* \* \*